Figure 1:
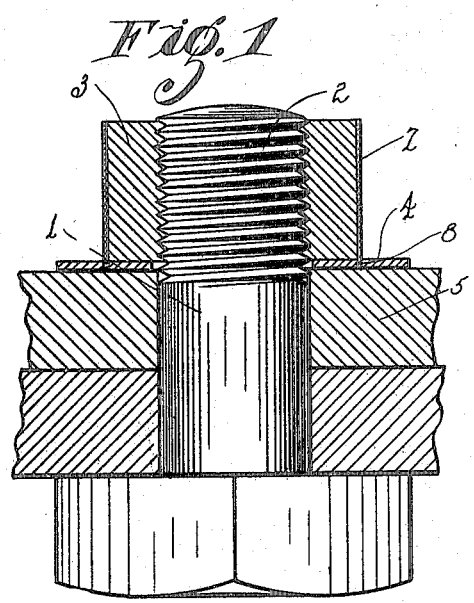

G. DOBBINS.
NUT LOCK.
APPLICATION FILED JUNE 19, 1916.

1,212,918.

Patented Jan. 16, 1917.

WITNESS.
Floyd M. Blanchard

INVENTOR.
George Dobbins
BY
ATTORNEY.

THE NORRIS PETERS CO., PHOTO-LITHO., WASHINGTON, D. C.

UNITED STATES PATENT OFFICE.

GEORGE DOBBINS, OF STOCKTON, CALIFORNIA, ASSIGNOR OF ONE-FOURTH TO J. B. FREEMAN, OF STOCKTON, CALIFORNIA.

NUT-LOCK.

1,212,918.        Specification of Letters Patent.        Patented Jan. 16, 1917.

Application filed June 19, 1916. Serial No. 104,432.

*To all whom it may concern:*

Be it known that I, GEORGE DOBBINS, a citizen of the United States, residing at Stockton, in the county of San Joaquin, State of California, have invented certain new and useful Improvements in Nut-Locks; and I do declare the following to be a full, clear, and exact description of the same, reference being had to the accompanying drawings, and to the characters of reference marked thereon, which form a part of this application.

This invention relates to improvements in locks whereby a nut may be locked stationary on its bolt with the possibility of its backing or creeping off the bolt being entirely eliminated.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 2:
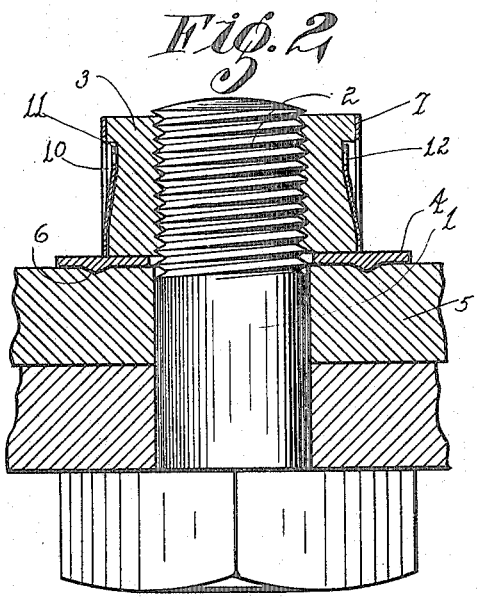
Figure 3:
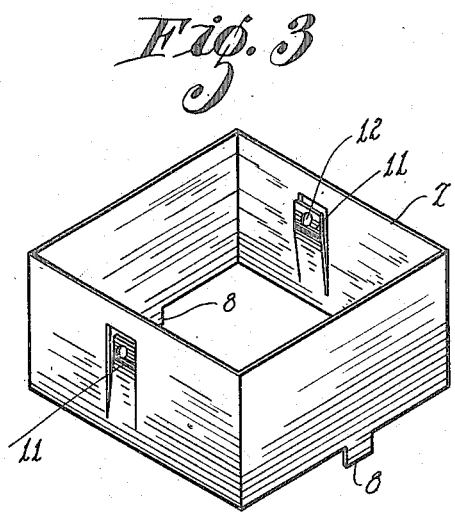
Figure 4:
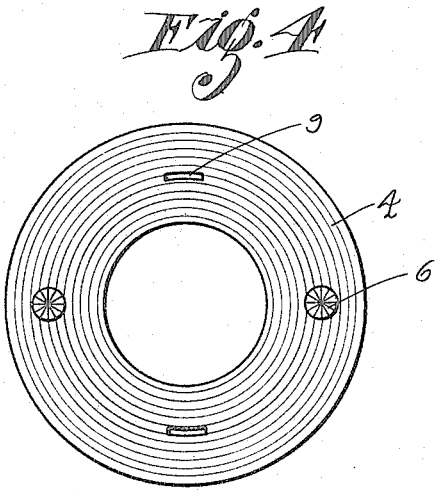

Figure 1 is a sectional view showing the nut mounted on a bolt and locked in position. Fig. 2 is a similar view but showing the section through the lock members. Fig. 3 is a perspective view of the lock band. Fig. 4 is a bottom plan view of the lock washer.

Referring now more particularly to the characters of reference on the drawings, the numeral 1 designates the bolt having the usual threads 2 on which is mounted the nut 3.

In providing my improved locking means I first have a washer 4 which fits over the bolt and against the part to be bolted as at 5. This washer 4 is provided on its inner side with a pair of sharp lugs 6 which may be driven into the wood or metal part 5 so as to prevent any rotation of the washer 4 relative to the bolt 1. After the washer has been placed in position, the nut 3 is then advanced upon the bolt against the washer. A band 7 shaped the same as the nut 3 is then fitted snugly over the nut and is provided with projecting lugs 8 which fit in the cross slots or recesses 9 in the face of the washer 4. The washer 4 being locked against rotation, this band 7 cannot therefore have any rotary movement with respect to the bolt 2 inasmuch as it it is locked stationary to the washer 4 by means of these lugs 8.

The sides of the nut are provided with a plurality of recesses 10 and the band 7 is provided with spring clips 11, which, when the band 7 is fitted over the nut 3, spring into the recesses 10 and lock the band 7 against being shaken off of the said nut. These clips 11 therefore lock the band 7 stationary on the nut, the band 7 is locked against rotation relative to the bolt, and hence the nut itself is locked stationary against rotation on the bolt and cannot therefore be shaken loose from the bolt.

The clips 11 are provided with orifices 12 whereby a tool may be inserted therein for the purpose of lifting the spring clips 11 out of the recesses 10 when it is desired to remove the band from the nut so that the nut can be removed from the bolt.

From the foregoing description it will very readily be seen that I have produced a very efficient and positive nut lock.

It will also be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention as defined by the appended claims.

Having thus described my invention what I claim as new and useful and desire to secure by Letters Patent is:

1. A nut lock comprising the combination with a bolt, of a washer fixed stationary with respect to the bolt and being provided with orifices, a nut mounted on the bolt and provided with recesses in its sides, a band fitted over the nut, lugs on the band projecting into the orifices in the washer, and spring clips carried by the band and engageable with the recesses in the nut to hold the band so that the lugs cannot be withdrawn from the orifices.

2. A nut lock comprising the combination with a bolt, of a washer fixed stationary with respect to the bolt, a nut mounted on the bolt and provided with recesses in its sides, a band fitted over the nut and fixed stationary with respect to the washer, and spring clips carried by the band and engageable with the recesses in the nut, such spring clips being provided with orifices.

In testimony whereof I affix my signature.

GEORGE DOBBINS.

Copies of this patent may be obtained for five cents each, by addressing the "Commissioner of Patents, Washington, D. C."